United States Patent
McCarthy

(10) Patent No.: US 8,947,760 B2
(45) Date of Patent: Feb. 3, 2015

(54) THERMOTROPIC OPTICAL SHUTTER INCORPORATING COATABLE POLARIZERS

(75) Inventor: Wil McCarthy, Lakewood, CO (US)

(73) Assignee: Ravenbrick LLC, Denver, CO (US)

( * ) Notice: Subject to any disclaimer, the term of this patent is extended or adjusted under 35 U.S.C. 154(b) by 0 days.

(21) Appl. No.: 13/601,472

(22) Filed: Aug. 31, 2012

(65) Prior Publication Data

US 2013/0141774 A1 Jun. 6, 2013

Related U.S. Application Data

(60) Provisional application No. 61/530,270, filed on Sep. 1, 2011.

(51) Int. Cl.
*G02F 1/01* (2006.01)
*G02F 1/13* (2006.01)
*G02B 5/30* (2006.01)
*G02B 26/02* (2006.01)

(52) U.S. Cl.
CPC ............. *G02F 1/0147* (2013.01); *G02F 1/132* (2013.01); *G02B 5/3016* (2013.01); *G02B 26/02* (2013.01)
USPC .......................................... 359/288; 427/168

(58) Field of Classification Search
CPC .. G02F 1/0147; G02B 5/3033; G02B 5/3041; G02B 5/305
USPC ........... 359/288, 240; 427/163.1, 168; 349/20
See application file for complete search history.

(56) References Cited

U.S. PATENT DOCUMENTS

| | | |
|---|---|---|
| 3,089,142 A | 5/1963 | Wickersham |
| 3,436,143 A | 4/1969 | Garrett |
| 3,754,271 A | 8/1973 | Epis |
| 3,886,558 A | 5/1975 | Cary et al. |
| 3,990,784 A | 11/1976 | Gelber |
| 4,006,730 A | 2/1977 | Clapham |
| 4,155,895 A | 5/1979 | Rohowetz |
| 4,268,126 A | 5/1981 | Mumford |

(Continued)

FOREIGN PATENT DOCUMENTS

| | | |
|---|---|---|
| CA | 2620005 | 7/2008 |
| CN | 1189224 | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — Darryl J Collins
*Assistant Examiner* — Gary O'Neill
(74) *Attorney, Agent, or Firm* — Dorsey & Whitney LLP

(57) ABSTRACT

A thermotropic optical shutter device incorporates coatable, thin-film polarizers with a thermotropic depolarizer. The coatable polarizers provide a mechanism for adjusting the polarizer properties (i.e., absorption, reflection, or diffusion) by changing the thickness of the coating. For example, a thicker film may have a higher relative polarizing efficiency while a thinner film may have a lower relative polarizing efficiency. Using the same base materials and manufacturing process, the contrast ratio and other properties of a thermotropic or thermochromic shutter device (e.g., a liquid crystal-based smart window film) may be adjusted in real time on the manufacturing line.

15 Claims, 2 Drawing Sheets

(56) References Cited

U.S. PATENT DOCUMENTS

| | | | |
|---|---|---|---|
| 4,387,377 | A | 6/1983 | Kandler |
| 4,456,335 | A | 6/1984 | Mumford |
| 4,475,031 | A | 10/1984 | Mockovciak, Jr. |
| 4,479,128 | A | 10/1984 | Brunner et al. |
| 4,491,390 | A | 1/1985 | Tong-Shen |
| 4,512,638 | A | 4/1985 | Sriram et al. |
| 4,579,638 | A | 4/1986 | Scherber |
| 4,640,583 | A | 2/1987 | Hoshikawa et al. |
| 4,641,922 | A | 2/1987 | Jacob |
| 4,688,900 | A | 8/1987 | Doane et al. |
| 4,688,901 | A * | 8/1987 | Albert .......................... 349/86 |
| 4,712,881 | A | 12/1987 | Shurtz et al. |
| 4,755,673 | A | 7/1988 | Pollack et al. |
| 4,756,758 | A | 7/1988 | Lent |
| 4,783,150 | A | 11/1988 | Tabony |
| 4,786,914 | A | 11/1988 | Wu et al. |
| 4,789,500 | A | 12/1988 | Morimoto et al. |
| 4,804,254 | A | 2/1989 | Doll et al. |
| 4,848,875 | A | 7/1989 | Baughman et al. |
| 4,859,994 | A | 8/1989 | Zola |
| 4,871,220 | A | 10/1989 | Kohin |
| 4,877,675 | A | 10/1989 | Falicoff et al. |
| 4,893,902 | A | 1/1990 | Baughman et al. |
| 4,899,503 | A | 2/1990 | Baughman et al. |
| 4,964,251 | A | 10/1990 | Baughman et al. |
| 5,009,044 | A | 4/1991 | Baughman et al. |
| 5,013,918 | A | 5/1991 | Choi |
| 5,025,602 | A | 6/1991 | Baughman et al. |
| 5,111,629 | A | 5/1992 | Baughman et al. |
| 5,132,147 | A | 7/1992 | Takiguchi |
| 5,152,111 | A | 10/1992 | Baughman et al. |
| 5,193,900 | A | 3/1993 | Yano et al. |
| 5,196,705 | A | 3/1993 | Ryan |
| 5,197,242 | A | 3/1993 | Baughman et al. |
| 5,212,584 | A | 5/1993 | Chung |
| 5,227,115 | A | 7/1993 | Harnischfeger |
| 5,274,246 | A | 12/1993 | Hopkins |
| 5,304,323 | A | 4/1994 | Arai et al. |
| 5,308,706 | A | 5/1994 | Kawaguchi et al. |
| 5,319,478 | A | 6/1994 | Funfschilling et al. |
| 5,347,140 | A | 9/1994 | Hirai |
| 5,377,042 | A | 12/1994 | Chahroudt |
| 5,434,587 | A | 7/1995 | Hannan |
| 5,481,400 | A | 1/1996 | Borden |
| 5,525,430 | A | 6/1996 | Chahroudi |
| 5,530,263 | A | 6/1996 | DiVincenzo |
| 5,574,286 | A | 11/1996 | Huston et al. |
| 5,585,035 | A | 12/1996 | Nerad et al. |
| 5,585,640 | A | 12/1996 | Huston |
| 5,757,828 | A | 5/1998 | Ouchi |
| 5,763,307 | A | 6/1998 | Wang |
| 5,881,200 | A | 3/1999 | Burt |
| 5,889,288 | A | 3/1999 | Futatsugi |
| 5,897,727 | A | 4/1999 | Staral et al. |
| 5,897,957 | A | 4/1999 | Goodman |
| 5,937,295 | A | 8/1999 | Chen |
| 5,940,150 | A | 8/1999 | Faris et al. |
| 5,948,486 | A | 9/1999 | Sage et al. |
| 5,968,411 | A | 10/1999 | Hall et al. |
| 6,010,641 | A | 1/2000 | Sage et al. |
| 6,030,668 | A | 2/2000 | Hall et al. |
| 6,040,859 | A | 3/2000 | Takahashi |
| 6,055,089 | A | 4/2000 | Schulz et al. |
| 6,099,752 | A | 8/2000 | Hall et al. |
| 6,099,758 | A | 8/2000 | Verrall et al. |
| 6,122,103 | A | 9/2000 | Perkins et al. |
| 6,124,918 | A | 9/2000 | Park et al. |
| 6,208,463 | B1 | 3/2001 | Hansen |
| 6,218,018 | B1 | 4/2001 | McKown et al. |
| 6,226,067 | B1 | 5/2001 | Nishiguchi |
| 6,240,114 | B1 | 5/2001 | Anselm |
| 6,260,414 | B1 | 7/2001 | Brown |
| 6,277,451 | B1 | 8/2001 | Mehl et al. |
| 6,281,519 | B1 | 8/2001 | Sugiyama et al. |
| 6,288,840 | B1 | 9/2001 | Perkins et al. |
| 6,294,794 | B1 | 9/2001 | Yoshimura et al. |
| 6,304,784 | B1 | 10/2001 | Allee |
| 6,312,770 | B1 | 11/2001 | Sage et al. |
| 6,320,220 | B1 | 11/2001 | Watanabe |
| 6,329,668 | B1 | 12/2001 | Razeghi |
| 6,333,516 | B1 | 12/2001 | Katoh |
| 6,381,068 | B1 | 4/2002 | Harada |
| 6,437,361 | B1 | 8/2002 | Matsuda |
| 6,446,402 | B1 | 9/2002 | Byker |
| 6,486,997 | B1 | 11/2002 | Bruzzone et al. |
| 6,487,112 | B1 | 11/2002 | Wasshuber |
| 6,493,482 | B1 | 12/2002 | Al-hemyari et al. |
| 6,498,354 | B1 | 12/2002 | Jefferson |
| 6,504,588 | B1 | 1/2003 | Kaneko |
| 6,512,242 | B1 | 1/2003 | Fan et al. |
| 6,559,903 | B2 | 5/2003 | Faris et al. |
| 6,583,827 | B2 | 6/2003 | Faris et al. |
| 6,600,169 | B2 | 7/2003 | Stintz |
| 6,611,640 | B2 | 8/2003 | LoCasclo |
| 6,635,898 | B2 | 10/2003 | Williams |
| 6,661,022 | B2 | 12/2003 | Morie |
| 6,671,008 | B1 | 12/2003 | Li et al. |
| 6,710,823 | B2 | 3/2004 | Faris et al. |
| 6,718,086 | B1 | 4/2004 | Ford |
| 6,730,909 | B2 | 5/2004 | Butler |
| 6,753,273 | B2 | 6/2004 | Holonyak, Jr. |
| 6,770,916 | B2 | 8/2004 | Ohshima |
| 6,777,718 | B2 | 8/2004 | Takagi |
| 6,816,525 | B2 | 11/2004 | Stintz |
| 6,847,662 | B2 | 1/2005 | Bouda |
| 6,859,114 | B2 | 2/2005 | Eleftheriades |
| 6,912,018 | B2 | 6/2005 | Faris et al. |
| 6,926,952 | B1 | 8/2005 | Weber et al. |
| 6,933,812 | B2 | 8/2005 | Sarabandi |
| 6,946,697 | B2 | 9/2005 | Pietambaram |
| 6,963,435 | B2 | 11/2005 | Mallya |
| 6,965,420 | B2 | 11/2005 | Li et al. |
| 6,978,070 | B1 | 12/2005 | McCarthy et al. |
| 6,985,291 | B2 | 1/2006 | Watson |
| 6,992,822 | B2 | 1/2006 | Ma |
| 7,026,641 | B2 | 4/2006 | Mohseni |
| 7,038,745 | B2 | 5/2006 | Weber et al. |
| 7,042,615 | B2 | 5/2006 | Richardson |
| 7,046,441 | B2 | 5/2006 | Huang |
| 7,068,234 | B2 | 6/2006 | Sievenpiper |
| 7,099,062 | B2 | 8/2006 | Azens et al. |
| 7,113,335 | B2 | 9/2006 | Sales |
| 7,133,335 | B2 | 11/2006 | Nishimura et al. |
| 7,154,451 | B1 | 12/2006 | Sievenpiper |
| 7,161,737 | B2 | 1/2007 | Umeya |
| 7,166,797 | B1 | 1/2007 | Dziendziel et al. |
| 7,221,827 | B2 | 5/2007 | Domash et al. |
| 7,245,431 | B2 | 7/2007 | Watson |
| 7,276,432 | B2 | 10/2007 | McCarthy et al. |
| 7,300,167 | B2 | 11/2007 | Fernando et al. |
| 7,306,833 | B2 | 12/2007 | Martin et al. |
| 7,318,651 | B2 | 1/2008 | Chua |
| 7,351,346 | B2 | 4/2008 | Little |
| 7,385,659 | B2 | 6/2008 | Kotchick |
| 7,470,925 | B2 | 12/2008 | Tamura |
| 7,522,124 | B2 | 4/2009 | Smith |
| 7,532,397 | B2 | 5/2009 | Tanaka |
| 7,538,946 | B2 | 5/2009 | Smith |
| 7,561,332 | B2 | 7/2009 | Little |
| 7,601,946 | B2 | 10/2009 | Powers |
| 7,619,816 | B2 | 11/2009 | Deng |
| 7,655,942 | B2 | 2/2010 | McCarthy |
| 7,692,180 | B2 | 4/2010 | Snyder |
| 7,755,829 | B2 | 7/2010 | Powers et al. |
| 7,768,693 | B2 | 8/2010 | McCarthy et al. |
| 7,911,563 | B2 | 3/2011 | Hung |
| 7,936,500 | B2 | 5/2011 | Powers |
| 7,977,621 | B2 | 7/2011 | McCarthy |
| 8,072,672 | B2 | 12/2011 | Powers |
| 8,076,661 | B2 | 12/2011 | McCarthy |
| 8,169,685 | B2 | 5/2012 | Powers |
| 8,271,241 | B2 | 9/2012 | Akyurtlu |
| 8,284,336 | B2 | 10/2012 | Powers |
| 2002/0079485 | A1 | 6/2002 | Stintz et al. |

(56) References Cited

U.S. PATENT DOCUMENTS

| | | |
|---|---|---|
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0035885 A1 | 2/2003 | Zang et al. |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0214632 A1 | 11/2003 | Aastuen |
| 2003/0218712 A1 | 11/2003 | Kumar et al. |
| 2003/0227663 A1 | 12/2003 | Agrawal |
| 2004/0005451 A1 | 1/2004 | Kretman |
| 2004/0012749 A1 | 1/2004 | Freeman |
| 2004/0027530 A1 | 2/2004 | Noiri et al. |
| 2004/0036993 A1 | 2/2004 | Tin |
| 2004/0113123 A1 | 6/2004 | Iftime et al. |
| 2004/0115366 A1 | 6/2004 | Iftime et al. |
| 2004/0150766 A1 | 8/2004 | Choo et al. |
| 2004/0256612 A1 | 12/2004 | Mohseni |
| 2005/0068629 A1 | 3/2005 | Fernando et al. |
| 2005/0099574 A1 | 5/2005 | Ueyama |
| 2005/0185125 A1 | 8/2005 | Miyachi |
| 2005/0221128 A1 | 10/2005 | Kochergin |
| 2005/0248715 A1 | 11/2005 | Byun et al. |
| 2005/0271092 A1 | 12/2005 | Ledentsov |
| 2006/0147810 A1 | 7/2006 | Koch |
| 2006/0151775 A1 | 7/2006 | Hollenberg |
| 2006/0238867 A1 | 10/2006 | Takeda |
| 2006/0257090 A1 | 11/2006 | Podolskiy |
| 2006/0262398 A1 | 11/2006 | Sangu et al. |
| 2006/0268216 A1 | 11/2006 | Song |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Ghandhi |
| 2008/0008857 A1 | 1/2008 | Kalkanoglu et al. |
| 2008/0013174 A1 | 1/2008 | Allen |
| 2008/0061222 A1 | 3/2008 | Powers et al. |
| 2008/0117500 A1 | 5/2008 | Narendran et al. |
| 2008/0138543 A1 | 6/2008 | Hoshino |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi |
| 2009/0167971 A1* | 7/2009 | Powers et al. ............... 349/18 |
| 2009/0219603 A1 | 9/2009 | Xue |
| 2009/0266394 A1 | 10/2009 | Tsubone |
| 2009/0268273 A1 | 10/2009 | Powers et al. |
| 2009/0296190 A1 | 12/2009 | Anderson |
| 2010/0001008 A1 | 1/2010 | McCarthy et al. |
| 2010/0015363 A1 | 1/2010 | Chiang et al. |
| 2010/0027099 A1 | 2/2010 | McCarthy |
| 2010/0045924 A1 | 2/2010 | Powers et al. |
| 2010/0051898 A1 | 3/2010 | Kim II |
| 2010/0060844 A1 | 3/2010 | Sawatari et al. |
| 2010/0118380 A1* | 5/2010 | Xue ............... 359/289 |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1 | 2/2011 | Santoro |
| 2011/0102878 A1 | 5/2011 | McCarthy et al. |
| 2011/0205650 A1 | 8/2011 | Powers et al. |
| 2011/0216254 A1 | 9/2011 | McCarthy et al. |
| 2011/0234944 A1 | 9/2011 | Powers et al. |
| 2011/0292488 A1 | 12/2011 | McCarthy et al. |
| 2012/0140311 A1 | 6/2012 | Powers et al. |
| 2012/0262773 A1 | 10/2012 | Powers et al. |
| 2013/0033738 A1 | 2/2013 | Powers et al. |

FOREIGN PATENT DOCUMENTS

| | | |
|---|---|---|
| CN | 1350648 | 5/2002 |
| CN | 1494091 | 5/2004 |
| EP | 1162496 | 12/2001 |
| GB | 2261989 | 6/1993 |
| JP | 49-94145 | 6/1974 |
| JP | 58-010717 | 1/1983 |
| JP | 59-231516 | 12/1984 |
| JP | 61-223719 | 10/1986 |
| JP | 01-178517 | 7/1989 |
| JP | 02-089426 | 3/1990 |
| JP | 05-147983 | 6/1993 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-012818 | 1/2004 |
| JP | 2004-291345 | 10/2004 |
| JP | 2005-250119 | 9/2005 |
| JP | 2006-243485 | 9/2006 |
| JP | 2006-285242 | 10/2006 |
| JP | 2007-515661 | 6/2007 |
| JP | 2007-272016 | 10/2007 |
| JP | 2008-530766 | 8/2008 |
| KR | 2002-0013986 | 2/2002 |
| KR | 2002-0044153 | 6/2002 |
| KR | 2003-0072578 | 9/2003 |
| KR | 10-2004-0048916 | 6/2004 |
| KR | 10-2004-0108816 | 12/2004 |
| KR | 10-2006-0000059 | 1/2006 |
| KR | 10-2007-0091314 | 9/2007 |
| KR | 10-2010-0039401 | 4/2010 |
| WO | 94/02313 | 2/1994 |
| WO | 97/01789 | 1/1997 |
| WO | 98/53504 | 11/1998 |
| WO | 01/23173 | 4/2001 |
| WO | 02/064937 | 8/2002 |
| WO | 03/029885 | 4/2003 |
| WO | 03/096105 | 11/2003 |
| WO | 2005/031437 | 4/2005 |
| WO | 2006/023195 | 3/2006 |
| WO | 2006/088369 | 8/2006 |
| WO | 2008/092038 | 7/2008 |
| WO | 2008/106596 | 9/2008 |
| WO | 2008/144217 | 11/2008 |

OTHER PUBLICATIONS

Eleftheriades, G.V., et al. (Editors); Iyers, "Negative-Refraction Metamaterials," Chapter 1 (Wiley 2005), pp. 4-5, 16-30, 321-330.

Fan, et al., "Thin-film conducting microgrids as transparent heat mirrors", Appl. Phys. Lett., vol. 28, No. 8, Apr. 5, 1976, 440-442.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

(56) References Cited

OTHER PUBLICATIONS

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

Siegel, J. D., "The MSVD Low E 'Premium Performance' Myth," International Glass Review, Issue 1, 2002, pp. 55-58.

Sung, J. et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L. et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.

Korean Intellectual Property Office as International Searching Authority, International Search Report for International Application No. PCT/US2012/053469, Feb. 26, 2013, 4 pages.

* cited by examiner

THERMOTROPIC OPTICAL SHUTTER INCORPORATING COATABLE POLARIZERS

CROSS REFERENCE TO RELATED APPLICATIONS

This application claims the benefit of priority pursuant to 35 U.S.C. §119(e) of U.S. provisional application no. 61/530,270 filed 1 Sep. 2011 entitled "Thermotropic optical shutter with coatable polarizer," which is hereby incorporated herein by reference in its entirety.

This application is related to U.S. Pat. Nos. 7,755,829; 7,768,693; 7,977,621; and 8,169,685 and to U.S. patent application Ser. No. 12/429,092 filed on 23 Apr. 2009; Ser. No. 12/545,051 filed on 20 Aug. 2009, Ser. No. 12/758,573 filed on 12 Apr. 2010; and Ser. No. 12/903,856 filed on 13 Oct. 2010, each of which is hereby incorporated by reference herein in its entirety.

BACKGROUND

1. Technical Field

The subject matter described herein relates to a thermotropic optical shutter device that incorporates one or more coatable polarizers. Implementations of such devices have application in passive or active light-regulating and temperature-regulating films, materials and devices, including construction materials.

2. Description of the Related Art

The problem of controlling the flow of radiant energy, e.g., light and heat, in particular in applications such as regulating solar heat gain in buildings and in other applications has previously been addressed using many optical and infrared methodologies. Photodarkening materials have been used for decades, for example, in sunglass lenses, to selectively attenuate incoming light when stimulated by ultraviolet (UV) radiation. When incorporated into windows, such materials can be used to regulate the internal temperature of a structure by darkening to attenuate bright sunlight, and by becoming transparent again to allow artificial light or diffuse daylight to pass through unimpeded. Such systems are passive and self-regulating, requiring no external signal other than ambient UV light in order to operate. However, because they are controlled by UV light rather than by temperature, such systems are of limited utility in temperature-regulating applications. For example, they may block wanted sunlight in cold weather as well as unwanted sunlight in hot weather. They also may not function if placed behind a UV-blocking material such as the transparent, spectrally-selective and low-emissivity coatings that are commonly employed in the window industry.

U.S. Pat. No. 7,755,829 to Powers et al. discloses an optical filter composed of a thermotropic, low clearing point, twisted nematic liquid crystal sandwiched between two reflective polarizers that can be used as a window film or other light- and heat-regulating building material. Similarly, in U.S. Pat. No. 8,169,685 to Powers et al., a thermodarkening filter composed of a low clearing point liquid crystal sandwiched between two absorptive polarizers is disclosed as a component of building materials, e.g., as a window film. In addition, U.S. Patent Application Publication No. 2009/0268273 to Powers et al. discloses a thermotropic optical filter incorporating both absorptive and reflective polarizers and U.S. Patent Application Publication Nos. 2010/0045924 and 2010/0259698 to Powers et al. disclose thermotropic, light-regulating liquid crystal devices that do not require polarizing substrates at all.

There are also numerous types of linear polarizers, including absorptive, diffusive, and reflective types made from stretched polymers. There are further linear, reflective wire grid polarizers, which are less commonly used but are nevertheless familiar structures. Finally, circular polarizers made from a coatable film of cholesteric liquid crystals, or CLCs, are also known. Thermotropic devices incorporating all of these polarizer types have been disclosed in U.S. Pat. No. 7,755,829 and related patents and patent applications to Powers and McCarthy.

Coatable linear polarizers are described, for example, in a scientific paper entitled "A novel thin film polarizer from photocurable non-aqueous lyotropicchromonic liquid crystal solutions" (Yun-Ju Bae, Hye-Jin Yang, Seung-Han Shin, Kwang-Un Jeong and Myong-Hoon Lee, J. Mater. Chem., 2011, 21, 2074). Korean researchers Bae et al. disclose a composition of matter which, when shear-coated and UV cured onto a glass surface, forms a thin-film polarizer. Shear may be induced by a number of different coating processes, including doctor blade coating, Mayer rod coating, roll coating, and gravure coating. Such processes are well described including, for example, in U.S. Patent 2002/0160296 to Wolk et al.

These shear-coated linear polarizers typically consist of lyotropic, chromonic liquid crystals (LCLCs), which are essentially dye molecules that have been functionalized so they behave as liquid crystals. These materials may be prepared using common synthetic organic chemistry techniques. In the base solution disclosed in Bae et al., the LCLC was mixed with a prepolymer material and then cured to form a polymer matrix with LCLC interspersed, providing increased mechanical stability to the system. These coatings are typically applied to either glass or thin film polymer substrates. Coatable polarizers made from chromonic liquid crystal polymers are also known.

Polymer-stabilized liquid crystal formulations and guest-host liquid crystal formulations may have both chemical and physical similarities to chromonic liquid crystal films, as both may be curable liquids that form highly ordered optical materials. It is also possible to incorporate polymerizable groups such as vinyl, acrylate, epoxide, isocyanate, etc. directly onto the LCLC itself to produce an integrated system containing a polymerizable LCLC. This strategy has proven effective in other systems incorporating lyotropic liquid crystals and the order of the liquid crystal is retained in the polymer structure.

The information included in this Background section of the specification, including any references cited herein and any description or discussion thereof, is included for technical reference purposes only and is not to be regarded as subject matter by which the scope of the present invention as claimed is to be bound.

SUMMARY

A thermochromic optical filter may be made by incorporating coatable polarizers rather than standard polarizers. The selection of the physical, chemical, and optical properties of the coatable polarizer layer may greatly simplify or enhance the design of thermochromic (e.g., thermoabsorptive, thermoreflective, or thermodiffusive) filters by, for example, allowing a polarizing layer to contact a liquid crystal layer directly, without the need for a chemical barrier layer, optical index matching layer, heat seal layer, or other layer between them, or by permitting polarizer production and thermochromic filter production to take place as part of the same manufacturing line. Coatable polarizers (whether absorptive, reflective, diffusive, or any combination thereof) provide a mechanism for adjusting the polarizer properties (i.e., absorption, reflection, or diffusion) simply by changing the thickness of the coating. For example, a thicker film may have a higher relative polarizing efficiency while a thinner film may have a lower relative polarizing efficiency. Thus, using the same base materials and manufacturing process, the contrast ratio and other properties of a thermotropic or thermochromic shutter device (e.g., a liquid crystal-based smart window film) may be adjusted in real time on the manufacturing line.

In one implementation a thermotropic shutter device has a transparent substrate, one or more thin film polarizer coatings applied to the transparent substrate in layers, and a thermotropic depolarizer supported by the transparent substrate. In a cold state the device exhibits a high transmission within a given wavelength band. In a hot state the device exhibits a low transmission within a given wavelength band.

In another implementation a method for altering one or more of absorption, reflection, diffusion, polarizing efficiency, contrast ratio, or visible light transmission properties of a thermotropic shutter device is provided. The thermotropic shutter device has a transparent substrate, one or more thin film polarizer coatings applied to the transparent substrate in layers, and a thermotropic depolarizer supported by the transparent substrate. The method includes adjusting a thickness of at least one of the thin film polarizer coatings.

In a further implementation method for altering one or more of absorption, reflection, diffusion, polarizing efficiency, contrast ratio, visible light transmission, bandwidth, center wavelength, UV resistance, chemical resistance, adhesion, or temperature stability properties of a thermotropic shutter device is provided. The thermotropic shutter device has a transparent substrate, one or more thin film polarizer coatings applied to the transparent substrate in layers, and a thermotropic depolarizer supported by the transparent substrate. The method includes adjusting a composition of at least one of the thin film polarizer coatings before applying at least one of the thin film polarizer coatings onto the transparent substrate.

In yet another implementation a method on a manufacturing line for adjusting properties of a thermotropic optical filter is provided. The thermotropic optical filter incorporates a thermotropic liquid crystal depolarizer supported on a transparent substrate. A coating station that deposits a thin film polarizing coating on the transparent substrate is incorporated into the manufacturing ling. One or more of a thickness, composition, or coating condition of the thin film polarizer coating is adjusted. The thermotropic liquid crystal depolarizer is applied on the thin film polarizer coating. The thermotropic optical filter is sealed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1:
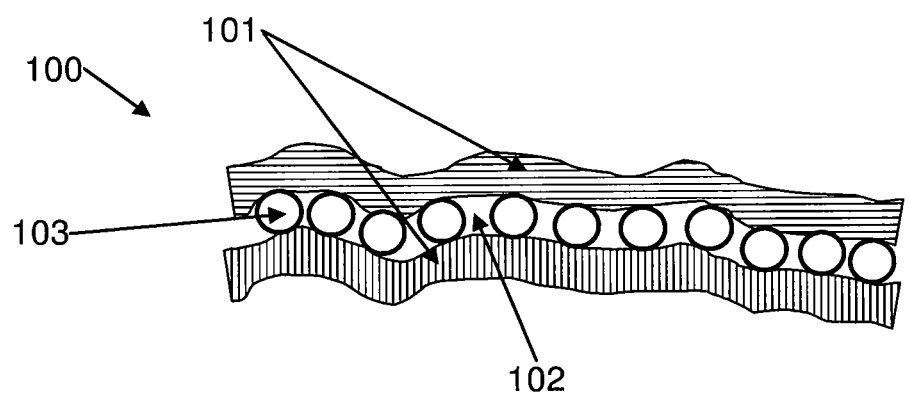
FIG. 1 is a schematic representation of a thermotropic, liquid crystal-based optical filter.

Thermotropic optical shutters incorporating polarizing films are useful as energy-regulating building materials, including "smart" window films that tint when heated. FIG. 1 is from the prior art (U.S. Patent Application Publication No. 2010/0045924 by Powers et. al.), and is a schematic representation of a thermotropic, liquid crystal-based optical filter 100. The space between the substrate materials 101 (e.g., polarizing films) is filled with a mixture of liquid crystal 102 and spacers 103. The spacers 103 in this design are microscopic, spherical, and have a small variance in size, providing a uniform cell gap between the substrate materials 101, such that the optical properties of the liquid crystal 102 do not vary in undesirable ways with location.

However, as disclosed, for example, in U.S. Patent Application Publication No. 2011/0102878 by McCarthy et al., it may be desirable to vary the absorptivity, reflectivity, diffusivity, polarizing efficiency, contrast ratio, visible light transmission, or bandwidth of one or more polarizers incorporated into such devices. Changes in the aforementioned properties of the thermochromic window filter may lead to performance enhancements including increased light transmission, larger "throw" (variance in Solar Heat Gain Coefficient) to allow more solar heat to be blocked or transmitted, and changes in the way the filter blocks said radiation by either absorbing, reflecting, or diffusing the light, thus altering its properties and appearance. In the case of the standard, commercially available, stretched-polymer polarizer types listed above, changes to these parameters may require significant changes to the manufacturing process, including stretch ratios, polymer gauges, dye concentrations, and more.

However, coatable polarizers (whether absorptive, reflective, diffusive, or any combination thereof) provide a mechanism for adjusting these parameters simply by changing the thickness of the coating. A thicker film may have a higher relative polarizing efficiency while a thinner film may have a lower relative polarizing efficiency. Thus, using the same base materials and manufacturing process, the contrast ratio (i.e., the ratio of the transmission through a pair of identical aligned polarizers to the transmission through the same pair of crossed polarizers) and other properties of a thermotropic or thermochromic shutter device (e.g., a liquid crystal-based smart window film) may be adjusted in real time on the manufacturing line.

In addition, while polarizing effects may be inherent in the molecular structure of the coating (as with commercially available intrinsic polarizers), the reflectivity, absorptivity, and diffusivity of the resulting coating may also be adjusted through changes in composition and/or the addition of dopants. For example, absorptive polarization may be affected by the addition of dichroic dyes (whether organic or inorganic), or absorptive molecules or particles that are aligned by the shear coating process, analogous to the iodine and dyestuff additives in a commercial PVA polarizer, and also somewhat analogous to the guest-host systems employed in liquid crystal device designs. Selective reflection along certain optical axes (e.g., reflective polarization) may be affected by shear-induced changes in the index of refraction of the coating, or through the addition of reflective dyes or particles that are aligned by the shear coating process. Selective diffusion along certain optical axes (e.g., diffusive polarization) may be affected by the addition of diffusive or index-mismatched particles (e.g., microscopic polymer rods) that are aligned by the shear-coating process, somewhat analogous to the diffusive reflective polarizing films (DRPFs) produced by 3M.

Depending on the exact composition of the coatable polarizer material and structure of the final coating, the coated layer may also serve other functions, including serving as a liquid crystal alignment layer, a chemical barrier layer, an anti-scratch layer, an antireflective coating, a LC cell gap spacer, a retardation layer, a planarizing layer, a heat-sealable layer, or an attachment point for polymer networks dispersed within the liquid crystal.

Figure 2:
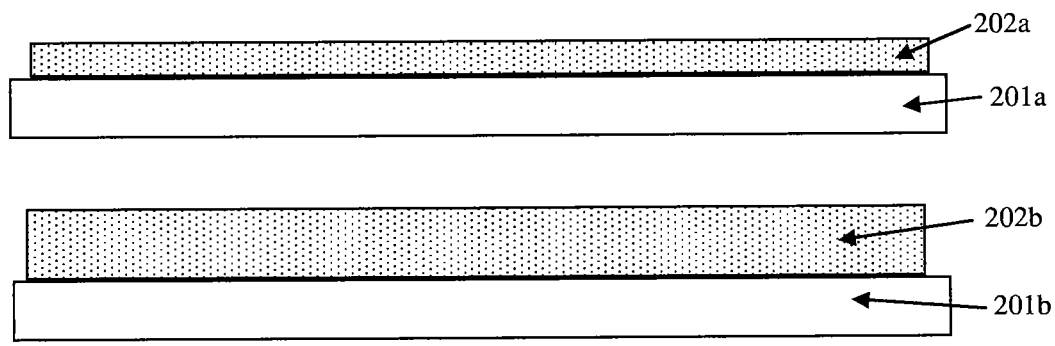
FIG. 2 is a schematic representation of both a thin, low-contrast linear polarizer coating and a thick, high-contrast linear polarizer coating.

FIG. 2 is a schematic representation of both a thin, low-contrast polarizer coating and a thick, high-contrast polarizer coating. A transparent or translucent substrate material 101a (e.g., a rigid or flexible polymer film) is coated with a thin layer of coatable linear polarizer 102a, whether absorptive, reflective, diffusive, diffractive, retro-reflective, or any combination thereof. The thickness of the coating 102a has been selected such that the contrast ratio of the polarizer achieves a particular desired value (e.g., 4:1). However, when a substrate material 101b is coated with a thicker coating 102b of the same coatable polarizer material, the contrast ratio is necessarily larger (e.g., 10:1) since there is more dichroic material in the optical path. Thus, the absorptivity, reflectivity, diffusivity, polarizing efficiency, contrast ratio, and/or visible light transmission may be significantly altered with no change to the composition of the polarizer coating.

Chemical modifications may be necessary to obtain good adhesion to polar surfaces such as glass versus non-polar surfaces found with many polymeric materials. These chemical modifications include changes in formulation including, but not limited to, incorporation of different anions or cations on the LCLC, use of polymer blends, solvents, or additives including, but not limited to, particles, photocurable monomers, or dyes. There are a number of other dyes that absorb in the UV, visible, and infrared regions that may be useful for this application and may behave similarly when functionalized in the same or a similar manner. Altering the cation and/or anion of a lyotropic liquid crystal, ionic liquid, or ionic polymer is known to have dramatic effects on its solubility and polarity.

Figure 3:
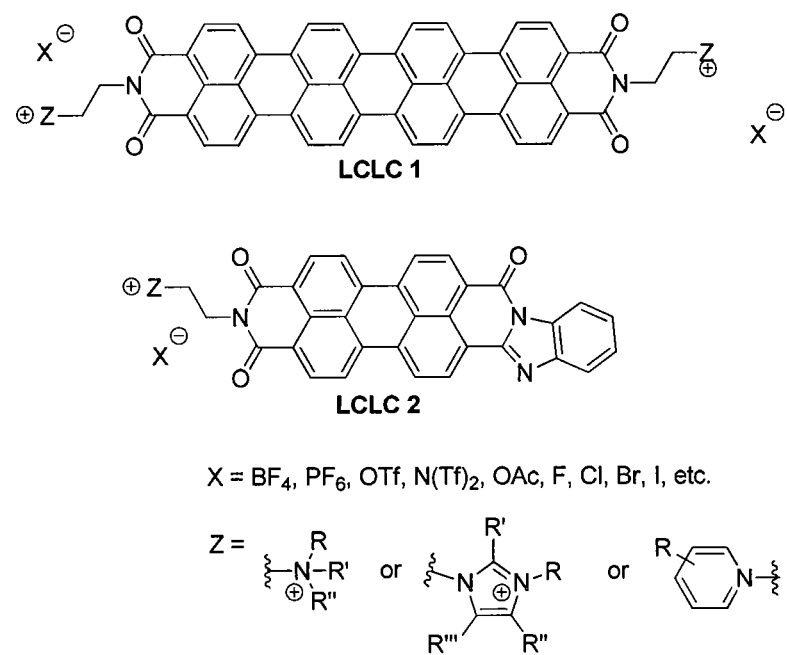
FIG. 3 depicts the chemical structure of representative LCLCs using core dye molecules known to work well for this application. A variety of anions and cations are shown, but are not limited to this collection.

FIG. 3 shows chemical structures of two well-known LCLCs that have been used to prepare coatable polarizers which employ the ammonium cation and either halide or carbonate anions. It is possible to exchange halide anions to a number of other anions using common techniques to alter the polarity and solubility properties of the LCLC. This is useful when coating the LCLCs onto substrates of different polarities or preparing solutions of LCLCs in organic, non-aqueous solvents. The LCLC core molecules are shown for exemplary purposes only, and there are a vast number of other common organic dye molecules that could be used in place of these cores to obtain different chemical, physical, or spectroscopic properties. Additionally the cations and anions listed in FIG. 3 are not limiting and could be any number of common anions used in the field of LCLCs, ionic liquids, and ionic polymers. Common classes of cations include tetra-substituted nitrogen and phosphorous species, heterocycles, natural products, etc.

Certain halide anions such as chloride and bromide may result in water soluble compounds. Conversely, the use of anion materials such as bis(trifluoromethanesulfonimide), triflate, or tetrafluoroborate, may switch the polarity of the compound, rendering it insoluble in water and soluble in organic solvents such as alcohols, acetone, ethyl acetate, etc. The ion exchange process is straightforward.

The selection of the physical, chemical, and optical properties of the coatable polarizer layer may greatly simplify or enhance the design of thermochromic (e.g., thermoabsorptive, thermoreflective, or thermodiffusive) filters by, for example, allowing a polarizing layer to contact a liquid crystal layer directly, without the need for a chemical barrier layer, optical index matching layer, heat seal layer, or other layer between them, or by permitting polarizer production and thermochromic filter production to take place as part of the same manufacturing line.

Guest-host liquid crystal formulations may have much in common with chromonic liquid crystal films, as both may be highly ordered systems that provide a director (i.e., an orientation force) to dichroic or pleochroic pigments, including elongated microparticles such as metal and polymer rods.

In addition, because the polarizer material is a liquid before coating (and, in some cases, curing), it is relatively straightforward to adjust its composition by adding dopants, fillers, or other components before the coating step. This provides another mechanism for adjusting the absorptivity, reflectivity, diffusivity, polarizing efficiency, contrast ratio, and/or visible light transmission of the polarizer, as well as other properties such as bandwidth, center wavelength, UV resistance, abrasion resistance, chemical resistance, adhesion, and temperature stability. Examples of such dopants may include, but are not limited to, particles, dyes, polymers, wire segments, and other types of liquid crystals.

Further, changes in the polarization axis of the film can be made by adjusting the coating direction, which may or may not be parallel to the draw direction of the film being coated. Such changes may be easier to implement than comparable changes in the stretching direction of traditional dye-polymer polarizers. Other methods may also exist for forming polarizing coatings, including extrusion, gravity shear coating ("dip and drip"), spray coating, spin coating, and other similar processes.

Thus, adjustment of the thickness or formulation of a coatable polarizer greatly facilitates the production of custom optical shutters. A single production line can produce polarizers with custom levels of light transmission (absorption, reflection, and diffusion), contrast ratio, and polarizing efficiency that can be easily adjusted during the manufacturing process, through straightforward changes in the coating thickness, and thus adjust the properties of the thermochromic filters made incorporating the coatable polarizer. Additionally, properties of the optical shutter film such as hardness, refractive index, adhesion, and chemical resistance can be adjusted through straightforward changes in composition of the coatable polarizer that may not require any change in the coating process. Further, the absorptivity, reflectivity, and diffusivity of the polarizing coating, and thus of the thermochromic filters made incorporating it, can also be adjusted through the addition of selected dopants. This represents a significant improvement over the use of other types of polarizers which are made from stretched and dyed PVA laminated between two sheets of a substrate material such as triacetyl cellulose. Further, custom polarizers must be manufactured in discrete batches that require shutting down and retooling a manufacturing line. Thus, costs may be reduced and product variety and performance are greatly increased through the use of coatable polarizers.

The above specification, examples and data provide a description of the structure and use of some exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. All directional references e.g., proximal, distal, upper, lower, inner, outer, upward, downward, left, right, lateral, front, back, top, bottom, above, below, vertical, horizontal, clockwise, and counterclockwise are only used for identification purposes to aid the reader's understanding of the present invention, and do not create limitations, particularly as to the position, orientation, or use of the invention. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. Stated percentages of light transmission, absorption, and reflection shall be interpreted as illustrative only and shall not be taken to be limiting. Changes in detail or structure may be made without departing from the basic elements of the invention as defined in the following claims.

What is claimed is:

1. A thermotropic shutter device comprising
a first transparent substrate;
a second transparent substrate;
one or more thin film polarizing coatings applied to at least the first transparent substrate, the one or more polarizing coatings acting as a linear polarizer when applied to at least the first transparent substrate; and
a thermotropic liquid crystal depolarizer supported by the first and second transparent substrates that rotates a polarity of light perpendicular to that of the thin film polarizing coatings on the first substrate and passing therethrough to a perpendicular polarity when in a twisted nematic state; wherein
in a cold state the thermotropic liquid crystal depolarizer is in the twisted nematic state and the device exhibits a high transmission within a given wavelength band, and
in a hot state the thermotropic liquid crystal depolarizer is not in the twisted nematic state and the device exhibits a low transmission within a given wavelength band.

2. The device of claim 1, wherein one or more thin film polarizing coatings are absorptive.

3. The device of claim 1, wherein one or more polarizing coatings are reflective.

4. The device of claim 1, wherein one or more thin film polarizing coatings are diffusive.

5. The device of claim 1, wherein one or more thin film polarizing coatings exhibit a combination of absorptive, reflective, and/or diffusive properties.

6. The device of claim 1, wherein one or more thin film polarizing coatings are used in conjunction with one or more polarizers of another type.

7. The device of claim 1, wherein absorption, reflection, diffusion, polarizing efficiency, contrast ratio, and visible light transmission properties of the device are adjustable by altering a thickness of the one or more thin film polarizing coatings.

8. The device of claim 1, wherein the given wavelength band includes one or more regions of the visible spectrum.

9. The device of claim 1, wherein the given wavelength band includes one or more regions of the ultraviolet spectrum.

10. The device of claim 1, wherein the given wavelength band includes one or more regions of the infrared spectrum.

11. The device of claim 1, wherein at least one of the first and second transparent substrates is a flexible film.

12. A method for altering one or more of absorption, reflection, diffusion, polarizing efficiency, contrast ratio, or visible light transmission properties of a thermotropic shutter device, wherein the thermotropic shutter device comprises a first transparent substrate, a second transparent substrate, one or more thin film polarizing coatings that are applied to at least the first transparent substrate and that act as a linear polarizer when applied to at least the first transparent substrate, and a thermotropic liquid crystal depolarizer supported by the first and second transparent substrates that rotates a polarity of light perpendicular to that of the thin film linear polarizing coating on the first substrate and passing therethrough to a perpendicular polarity when in a twisted nematic state, the method comprising
adjusting a thickness of at least one of the thin film polarizing coatings while applying the thin film polarizing coatings to at least the first transparent substrate.

13. A method for altering one or more of absorption, reflection, diffusion, polarizing efficiency, contrast ratio, visible light transmission, bandwidth, center wavelength, UV resistance, chemical resistance, adhesion, or temperature stability properties of a thermotropic shutter device, wherein the thermotropic shutter device comprises a first transparent substrate, a second transparent substrate, one or more thin film polarizing coatings that are applied to at least the first transparent substrates and that act as a linear polarizer when applied to at least the first transparent substrate, and a thermotropic liquid crystal depolarizer supported by the first and second transparent substrates that rotates a polarity of light perpendicular to that of the thin film linear polarizing coating on the first substrate and passing therethrough to a perpendicular polarity when in a twisted nematic state, the method comprising
adjusting a composition of at least one of the thin film polarizing coatings before applying at least one of the thin film polarizing coatings onto the transparent substrate.

14. A method on a manufacturing line for adjusting properties of a thermotropic optical filter incorporating a thermotropic liquid crystal depolarizer supported on a first transparent substrate, the method comprising
incorporating a coating station that deposits a thin film linear polarizing coating on the first transparent substrate, wherein the thin film polarizing coating acts as a linear polarizer when applied to at least the first transparent substrate, and the thermotropic liquid crystal depolarizer rotates a polarity of light perpendicular to that of the thin film linear polarizing coating on the first transparent substrate and passing therethrough to a perpendicular polarity when in a twisted nematic state;
adjusting one or more of a thickness, composition, or coating condition of the thin film polarizing coating to thereby adjust one or more of an absorption, refection, or diffusion parameter of the polarizing coating;
applying the thermotropic liquid crystal depolarizer on the thin film polarizer coating;
placing a second transparent substrate on the thermotropic liquid crystal depolarizer; and
sealing the first and second transparent substrates together to form the thermotropic optical filter.

15. The method of claim 14 further comprising
depositing a second thin film linear polarizing coating on the second transparent substrate; and wherein the placing operation further comprises orienting the second transparent substrate such that a polarity of the second thin film linear polarizing coating is orthogonal to the thin film linear polarizing coating on the first transparent substrate.

* * * * *